United States Patent [19]
Bedell et al.

[11] Patent Number: 4,814,051
[45] Date of Patent: Mar. 21, 1989

[54] PROCESS FOR THE RECOVERY OF ALKANOLAMINES FROM THEIR HEAT-STABLE SALTS FORMED IN ALKANOLAMINE SORBENT SOLUTIONS

[75] Inventors: Stephen A. Bedell, Lake Jackson; Susan S. Kuan Tsai, Pearland, both of Tex.

[73] Assignee: The Dow Chemical Company, Midland, Mich.

[21] Appl. No.: 149,778

[22] Filed: Jan. 29, 1988

[51] Int. Cl.$^4$ .............................................. C25B 3/00
[52] U.S. Cl. ...................................... 204/72; 423/228; 423/229; 204/130; 204/91; 204/292; 204/284; 204/290 R; 204/290 F
[58] Field of Search ................... 204/182.4, 180.8, 72; 423/228, 229

[56] References Cited

U.S. PATENT DOCUMENTS

| 32,398 | 4/1887 | De Witt | 204/72 |
| 2,768,945 | 10/1956 | Shapiro | 204/72 |
| 3,554,691 | 1/1971 | Kuo | 204/182.4 |
| 4,147,754 | 4/1979 | Ward | 423/224 |

Primary Examiner—John F. Niebling
Assistant Examiner—Isabelle Rodriguez
Attorney, Agent, or Firm—G. R. Baker

[57] ABSTRACT

There is described a simple two compartment electrochemical cell which may be associated in multiples in parallel for electrochemically freeing alkanolamines of the heat stable salt forming anions found or formed in acid gas conditioning thermal regenerative sorbent processes using alkanolamines as sorbents for acid gases, the cell having an anion exchange membrane separating the cell into two compartments and an anode comprised of an iridium coated electroconductive metal electrode.

4 Claims, No Drawings

PROCESS FOR THE RECOVERY OF ALKANOLAMINES FROM THEIR HEAT-STABLE SALTS FORMED IN ALKANOLAMINE SORBENT SOLUTIONS

BACKGROUND OF THE INVENTION

The prior art is aware that in the conditioning of natural and synthetic gases to remove the acid gases such as hydrogen sulfide, carbon dioxide, carbonyl sulfide and the like, other acids, such as formic, sulfuric sulfurous, thiocyanic, oxalic, chloric acids as well as other acids, are generally also present in these gases and these acids form heat stable salts with the amine sorbents. These salts build up in the amine treating solution and must periodically be removed to maintain the overall efficiency of the amine with respect to regeneration for reuse in the absorbing process. The conventional manner for renewal of an amine sorbing solution contaminated with the heat stable salts, of the aforestated acids, is to transport the amine solution to a caustic treater wherein the salts are decomposed to their respective amine and acid components, wherein the latter is recovered as the alkali salt of the acid. Such processes are time consuming, not readily adaptable to field unit operations on site of the absorber and are relatively expensive, particularly because of the need to transport the solution to be regenerated from the site to a caustic processing plant which to be economically viable must serve several absorber operations.

It has been known for considerable time that amine salts in general and those produced as a result of the gas conditioning of natural and synthetic gases could be regenerated by electrochemical action. For example, Shapiro, U.S. Pat. No. 2,768,945, teaches one method for separating acidic gases from aqueous alkanolamine solutions used as absorbing solutions in the gas conditioning field. The Shapiro technique uses an electrochemical treatment of a portion of the thermally regenerated sorbing solution, a side stream, in a cell which separates the anode and cathode compartments from each other by use of a porous diaphragm. The anode is graphite and the cathode is steel. The anolyte is a weak acid and the catholyte is the amine solution. In another patent, Kuo et al, U.S. Pat. No. 3,554,691, the electrolytic conversion of amine salts of the principal acid gases, such as hydrogen sulfide and carbon dioxide, is described without mention of the effect of such electrochemical conversion of the other heat stable salts, viz., the amine formates, thiocyanates, sulfates, sulfites, oxalates, chlorides and the like. This patent uses a multicompartment cell having at least one ion exchange resin-water compartment separating the electrode compartments each from intermediate compartments, which intermediate compartments include an acid compartment and product compartment, respectively, and a central feed compartment, all defined by ion (cation or anion exchange) permeable membranes between compartments.

Neither of these processes is known to be used today, Shapiro being comparatively more expensive to operate than periodic purging of a portion of the sorbent and replenishment with virgin sorbent diluting the heat stable salt concentration to a level whereat the effect of the presence of the tied up (protonated) amine is minimized. Kuo et al is far too expensive to operate since a multiplicity of cells between electrodes increases the internal resistance of the cell increasing operating costs at least proportionally.

BRIEF DESCRIPTION OF THE INVENTION

It has now been found that an economical electrochemical cell, and, thus, an economical conversion can be run in the field using the Shapiro scheme of side stream reclamation if the cell is designed as a simple two compartment cell employing specific materials of construction. Thus, an efficient cell can be produced when (a) a dimensionally stable transition metal oxide coated electrode is used as the anode (particularly iridium oxide coated materials, stable under the conditions of environment herein described, e.g., titanium or tantalum, commonly used as anodes in conventional cells); and (b) a single anion exchange membrane, quaternerized functionalized polymers such as aminated polystyrene (e.g.; sold under the trademark Ionics by Ionics, Inc. or Ionac, e.g., Ionac MA3475, by Sybron) separating the anode and cathode compartments. The cathode may be any suitable material having electroconductivity and stable under the use environment, e.g., porous graphite, nickel and the like.

Experimentation has established that a graphite anode, as used by Shapiro, is a poor material since the current densities are low, and, while nickel and steel have high current densities), they are unstable and will dissolve or corrode under the operating conditions. Other well known anode electrode materials, such as titanium and tantalum, have been shown to have low, on the order of graphite, operating current densities. Experimentation likewise has shown that an electrode coated with ruthenium oxide has the ability to operate at high current densities, but is not long-lived enough to be commercially viable under conditions normally found in the field, since the ruthenium is worn away in about 30 days. Iridium oxide on titanium is shown herein to operate at high current densities and to be sufficiently long lived to be commercially viable. Similarly, tantalum is expected to give equivalent results when coated with iridium oxide. The following data, collected from laboratory experimentation, illustrates the foregoing discoveries:

TABLE 1

| ANDOE MATERIAL | CURRENT DENSITY (amps/ft$^2$) | | | |
|---|---|---|---|---|
|  | 3 V | 5 V | 7 V | 9 V |
| Porous Graphite | 0 | 2.9 | 20.1 | 37.3 |
| Nickel* | 33.4 | 56.2 | 78.6 | 101.0 |
| Titanium | 2.4 | 3.5 | 4.7 | 5.9 |
| RuO$_2$/titanium** | 37.7 | 49.5 | 67.4 | 85.7 |
| iridium oxide/ titanium*** | current density not measured in the laboratory | | | |

*Nickel dissolved
**the ruthenium coating wore away during field trials in less than 400 hours;
***electrode still operated after 5000 hours of field trial operation.

Thus, the only metal oxide coated anode materials found useful to date in this electrochemical process on a commercially viable scale are the iridium oxide coated stable anode materials. To prove the commercial viability of the discovery a full scale gas treating plant had a side stream from the regenerator return line passed to a cell at a rate of about one gallon per minute. The absorbent side stream analyzed 3.53% heat stable salts entering the cell and 3.18% leaving the cell, representing a 10% reduction in heat stable salts.

DETAILED DESCRIPTION OF THE INVENTION

The following examples illustrate the experimentation and provide the data to demonstrate the improved and unexpected results achieved by employing electrochemical cells constructed in accordance with the present invention:

A series of laboratory experiments were run to collect data on cell construction material. The cell was approximately, 4×4 inches by 3 inches. The cathode was a 3×3×1 inch piece of porous graphite and the anode was a 3×3 inch piece of expanded nickel. The anode compartment was separated from the cathode compartment by an anion exchange membrane, Ionics, Inc. 103 PZL-386. The catholyte solution was prepared by mixing 5.95 g. of methyldiethanolamine with 2.61 g. of 88% formic acid in 500 ml. of water. The initial pH was 4.89. The anolyte solution was 500 ml. of a 0.10M aqueous solution of NaCl. The catholyte was pumped through the porous graphite cathode at a rate of 300 ml/m. A D.C. power supply was connected across the electrodes and the current density was measured. In the first control experiment the anolyte and catholyte were analyzed for formic acid content. This data is set forth in table 2 resulting from a control run employing an expanded nickel anode.

TABLE 2

| Time (hrs) | ppm FORMATE | |
| | Anolyte | Catholyte |
| --- | --- | --- |
| 0.00 | 0 | 3892 |
| 0.50 | 538 | 3332 |
| 1.03 | 1347 | 2737 |
| 1.70 | 1904 | 2184 |
| 2.53 | 2618 | 1575 |
| 3.45 | 3224 | 933 |
| 4.45 | 3649 | 612 |

The final pH of the catholyte was 10.34. The nickel anode was partially dissolved.

Employing the same cell, changing only the cathode material and using 0.5M sodium carbonate in both electrode compartments the results set forth in Table 1 above were obtained.

Table 1, demonstrates that nickel is capable of operating at a high current density but is unsuitable as an anode in this system because it is soluble in the anolyte. Graphite and titanium are not suitable because while stable in the anolyte, their low current density makes a cell too expensive to operate. Thus only rare earth coated metals are useful and practical for such an operation.

Comparative field test
Run 1, Stainless Steel anodes

A treating unit was constructed of four cathode compartments and three anode compartments each separated from the other by an Ionics anion membrane. The cathodes in each cathode compartment were 14×14 inches square expanded nickel sheets. The anodes were 316 stainless steel punched plate. The electrodes were connected in parallel. Lean methyldiethanolamine (MDEA) at 120° C. and 200 psig was filtered and metered to the treating unit cathode compartments. The anolyte solution was originally a 10% sodium carbonate solution which was circulated through the anode compartments. The pH of the anolyte was maintained between about 8 and 11 by periodic additions of 15% aqueous sodium hydroxide. The volume of the anolyte solution was maintained constant. The following table sets forth the results:

TABLE 3

| Run time (hrs) | Current (amps) | Voltage | Amine Flow (GPM) | Hss* (wt %) in | Hss* (wt %) out | MDEA Regen #/hr |
| --- | --- | --- | --- | --- | --- | --- |
| 0.5 | 320 | 5.8 | 1.0 | 4.86 | 4.43 | 2.52 |
| 5.0 | 480 | 9.9 | 1.1 | 4.73 | 4.36 | 2.11 |
| 17.5 | 391 | 16.2 | 1.1 | 4.67 | 4.35 | 1.83 |
| 20.5 | 338 | 19.8 | 1.3 | 3.82 | 3.69 | 1.55 |

*HSS heat stable salts

Although the heat stable salts were being regenerated, the stainless steel anodes proved to be a failure since under the use environment the electrodes (anodes) completely corroded in 20.5 hours.

Run 2.
Ruthenium Coated Anodes

A treating unit was constructed of four cathode compartments and three anode compartments each separated from the other by an Ionics anion membrane. The cathodes in each cathode compartment were 14×14 inches square expanded nickel sheets. The anodes were ruthenium coated expanded nickel sheets. The electrodes were connected in parallel. Lean methydiethanolamine at 120° C. and 200 psig was filtered and metered to the treating unit cathode compartments. The anolyte solution was originally a 10% sodium carbonate solution which was circulated through the anode compartments. The pH of the anolyte was maintained between about 8 and 11 by periodic additions of 15% aqueous sodium hydroxide. The volume of the anolyte solution was maintained constant. The following table sets forth the results:

TABLE 4

| Run time (hrs) | Current (amps) | Voltage | Amine Flow (GPM) | HSS (wt %) in | HSS (wt %) out | MDEA Regen #/hr |
| --- | --- | --- | --- | --- | --- | --- |
| 0.5 | 363 | 7.58 | 1.0 | 3.5 | 3.1 | 2.07 |
| 48 | 495 | 9.18 | 1.7 | | | |
| 61 | 500 | 9.26 | 0.8 | 3.24 | 3.17 | 0.29 |
| 78.5 | 500 | 9.31 | 0.9 | 3.5 | 3.3 | 0.93 |
| 92 | 310 | 7.81 | 0.9 | | | |
| 95 | 300 | 5.80 | 1.3 | 3.17 | 3.01 | 1.08 |
| 181 | 300 | 5.69 | 1.3 | 3.36 | 3.13 | 1.55 |
| 288 | 405 | 6.46 | 1.3 | 3.1 | 3.0 | 0.67 |
| 290 | 405 | 7.78 | 0.7 | 3.0 | 2.6 | 1.45 |
| 292.5 | 450 | 7.13 | 0.9 | 3.0 | 2.6 | 1.87 |
| 388 | cell shut down, voltage exceeded 20 volts at 10 amps. | | | | | |

Anode analysis with electron microscopy showed all the ruthenium oxide coating had worn off after only 388 hours. This field trial illustrates that while ruthenium oxide coating of the anode material gave positive results, the coating was not a satisfactory coating for extended use such as required in the environment of gas conditioning.

EXAMPLE 1

Iridium oxide anodes

The replacement of the anode electrodes of the cell of Runs 1 and 2 with iridium oxide coated expanded titanium sheets was then field tested and proved to be satisfactory under the use environment. The data collected from this field trial is set forth in table 5.

TABLE 5

| Run time (hrs) | Current (amps) | Voltage | Amine Flow (GPM) | HSS* (wt %) in | HSS* (wt %) out | MDEA Regen #/hr |
|---|---|---|---|---|---|---|
| 1 | 360 | 4.8 | 1.13 | 5.3 | 5.2 | 0.59 |
| 22.5 | 360 | 4.7 | 1.31 | 5.9 | 4.9 | 6.79 |
| 42 | 480 | 5.62 | 1.31 | 5.7 | 5.1 | 4.07 |
| 67 | 180 | 4.35 | 0.87 | | | |
| 169 | 405 | 5.3 | 1.13 | 5.29 | 4.94 | 2.05 |
| 211 | 400 | 4.82 | 1.22 | 4.63 | 4.56 | 0.44 |
| 255 | 400 | 4.65 | 1.18 | 4.67 | 4.29 | 2.32 |
| 284 | 400 | 4.42 | 1.18 | 4.64 | 4.29 | 2.14 |
| 308 | 400 | | 1.15 | 4.37 | 3.96 | 2.44 |
| 332 | 402 | 4.85 | 1.13 | 4.78 | 4.57 | 1.23 |
| 356 | 405 | 4.26 | 1.22 | 4.72 | 4.67 | 0.32 |
| 380 | 405 | 4.28 | 1.09 | | | |
| 404 | 410 | 4.2 | 1.00 | 5.34 | 4.76 | 3.01 |
| 428 | 400 | 4.25 | 1.13 | 4.55 | 4.47 | 0.47 |
| 452 | " | 4.3 | 1.13 | 4.97 | 4.65 | 1.87 |
| 476 | " | 4.28 | 1.09 | 4.84 | 3.83 | 5.71 |
| 500 | " | 4.14 | " | 5.20 | 4.88 | 1.81 |
| 524 | " | 4.31 | " | 5.18 | 4.47 | 4.01 |
| 572 | " | 4.36 | 1.31 | | | |
| 620 | " | 4.3 | 1.09 | 5.07 | 4.56 | 2.88 |
| 688 | " | 4.8 | 1.00 | 4.74 | 4.57 | 1.04 |
| 692 | 390 | 4.5 | 1.09 | 4.71 | 4.57 | 0.79 |
| 740 | 400 | 4.9 | 1.09 | 4.92 | 4.81 | 0.62 |
| 788 | " | 4.5 | 1.18 | 5.35 | 5.12 | 1.41 |
| 812 | " | - | 1.09 | 4.99 | 4.77 | 1.24 |

*HSS heat stable salts

Analysis of the anode by microscopy at 700 hours showed less than 5% loss of coating. To date the cells have been operated over 5000 hours with no appreciable change in results.

We claim:

1. In an alkanolamine sorbent gas conditioning process for the removal of acid gases from natural and synthetic gas streams containing one or more of the acid gases and in which process heat stable salts of alkanolamines consisting of formates, sulfites, oxalates, thiocyanates and chlorides of alkanolamines are formed, wherein the process comprises the use of an absorber and a thermal regenerator the improvement which consists of (a) treating a portion, a side stream of less than the total, of the lean regenerated amine sorbent solution produced in the thermal regeneration step of said gas conditioning process, in an electrochemical cell or cells each cell comprised of (i) a container separated into two compartments by an anion exchange membrane, one of said compartments, the cathode compartment, having an electroconductive expanded metal plate cathode connected to a power source and the other compartment, the anode compartment, having an anode similarly connected to a power source, the latter electrode, the anode, is an iridium oxide coated electrically conductive metal in an electrochemical cell and stable for at least 5000 hours of use, (b) feeding the side stream to the cathode compartment as the catholyte and (c) withdrawing from said cathode compartment a lower concentration heat stable salt lean sorbent having less concentration of heat stable salts than the lean sorbent side stream entering said compartment, (d) mixing the so treated lower concentration heat stable salt lean sorbent with the lean regenerated amine sorbent side stream and returning the combined streams to the absorber in said process, said anode compartment containing an anolyte being an aqueous solution of an alkali metal salt capable of reacting with the aforedescribed anions of said heat stable salts, and (e) maintaining the concentration of ionized alkali metal in said anode compartment at a level to neutralize said anions of said heat stable salts in said side stream, (f) discarding a portion of said anolyte and (g) adding make up volumes of anolyte composition to said anode compartment to maintain said concentration.

2. In the process of claim 1 wherein said anodes are expanded electroconductive metal plates coated with iridium oxide.

3. In the process of claim 1 wherein the anode is an iridium oxide coated expanded titanium plate.

4. In the process of claim 1 wherein the anode is selected from the group consisting of titanium or tantalum coated with iridium oxide and said cathode is nickel.

* * * * *

UNITED STATES PATENT AND TRADEMARK OFFICE
CERTIFICATE OF CORRECTION

PATENT NO. : 4,814,051

DATED : March 21, 1989

INVENTOR(S) : Stephen A. Bedell and Susan S. Kuan Tsai

It is certified that error appears in the above-identified patent and that said Letters Patent is hereby corrected as shown below:

Col. 2, line 49, table 1; change "ANDOE" to --ANODE--.

Col. 4, line 11, table 3; change "3.82" to --3.92--.

Col. 4, line 55; change "illustrates" to --illustrated--.

Col. 5, line 22, table 5; change "688" to --668--.

Col. 6, line 27; insert a space between "afore" and "described".

Signed and Sealed this

Seventh Day of August, 1990

Attest:

HARRY F. MANBECK, JR.

*Attesting Officer*   *Commissioner of Patents and Trademarks*